(12) United States Patent
Pogde et al.

(10) Patent No.: US 9,049,030 B1
(45) Date of Patent: Jun. 2, 2015

(54) METHODS AND APPARATUS FOR EFFICIENT MULTICAST

(71) Applicant: Juniper Networks, Inc., Sunnyvale, CA (US)

(72) Inventors: Pranay K. Pogde, Sunnyvale, CA (US); James Murphy, Alameda, CA (US); Abhijit Choudhury, Cupertino, CA (US); Raghavendra Mallya, Cupertino, CA (US); Sandeep Bajaj, Fremont, CA (US); Bharani Chadalavada, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 198 days.

(21) Appl. No.: 13/729,397

(22) Filed: Dec. 28, 2012

(51) Int. Cl.
   *H04L 12/18* (2006.01)
(52) U.S. Cl.
   CPC .................................. *H04L 12/18* (2013.01)
(58) Field of Classification Search
   USPC ........................................................ 370/390
   See application file for complete search history.

(56) References Cited

U.S. PATENT DOCUMENTS

2007/0116014 A1* 5/2007 Shuen et al. ............. 370/395.53
2010/0290398 A1* 11/2010 Choudhary et al. .......... 370/328

OTHER PUBLICATIONS

"Multicast VLAN registration," Wikipedia, Aug. 22, 2011, Retrieved from the Internet: <URL: http://www.en.wikipedia.org/w/index.php?title=MulticastVLAN_registration&oldid=446186492/> (1 page).
"Understanding Multicast VLAN Registration on EX Series Switches," Published Jul. 22, 2009 (2 pages).

* cited by examiner

*Primary Examiner* — Dang Ton
*Assistant Examiner* — Mewale Ambaye
(74) *Attorney, Agent, or Firm* — Cooley LLP

(57) ABSTRACT

In some embodiments, an apparatus includes a core network node configured to associate with a native multicast group a first client device that is associated with a first virtual local area network (VLAN) and operatively coupled to the core network node via a first access network node and an aggregation network node. The core network node can associate with the native multicast group a second client device that is associated with a second VLAN and operatively coupled to the core network node via a second access network node and the aggregation network node. The core network node can define a multicast VLAN including the first VLAN and the second VLAN based on the native multicast group. The core network node can receive a multicast data unit associated with the native multicast group and can also define a single instance of the multicast data unit for the multicast VLAN.

17 Claims, 5 Drawing Sheets

METHODS AND APPARATUS FOR EFFICIENT MULTICAST

BACKGROUND

Some embodiments described herein relate generally to methods and apparatus for enabling efficient multicast data traffic flow. In particular, but not by way of limitation, some embodiments described herein relate to methods and apparatus for defining multicast virtual local area networks (mVLANs) by grouping individual VLANs and defining multicast tunnels associated with the mVLANs.

In some converged networks, unicast tunnels are established between the core network node and each access network node. In large campus or enterprise networks, thousands of access network nodes and multiple client devices that subscribe to the same native multicast group. In such cases, the core network node sends a copy of the multicast data unit via the unicast tunnel to each access network node that is coupled to client devices that subscribe to the native multicast group. All the unicast tunnels, however, are constructed over the same physical network infrastructure of the campus network. Hence, thousands of copies of the same data unit can traverse over the same physical links, thereby significantly wasting bandwidth in the campus network. Additionally, making thousands of copies of a data unit requires increased processing power at the core network node.

Additionally, the multicast forwarding rules are produced at the core network node on per-VLAN basis as the client devices in the VLAN subscribe to the native multicast group. A copy of the multicast data unit is made for each VLAN at the core network node. Typically, most large campus or enterprise networks have thousands of VLANs. Hence, a copy of the multicast data unit per VLAN (among thousands of VLANs) traversing over thousands of unicast tunnels compounds the problem of extremely high computational demands and bandwidth wastage on the infrastructure of a campus or enterprise network.

Known methods for overcoming bandwidth demand problems in campus networks include defining a single default multicast tunnel statically from the core network node to all access network nodes. In such methods, the core network node sends all the multicast traffic into the default multicast tunnel. One drawback of such method is that the multicast traffic reaches all the access network nodes regardless of whether or not any client devices associated with an access network node subscribed to the native multicast group. Additionally, the multicast forwarding in such methods is not virtual router (or anchor) specific. Hence, client devices can possibly receive multicast traffic from sources in other virtual routers. This can lead to unnecessary use of computational resources and wastage of bandwidth in a campus or enterprise network.

Accordingly, a need exists for methods and apparatus that can enable efficient multicast traffic flow that can significantly reduce bandwidth wastage and can significantly reduce high computational demands on the core network nodes.

SUMMARY

In some embodiments, an apparatus includes a core network node configured to associate with a native multicast group a first client device that is associated with a first virtual local area network (VLAN) and operatively coupled to the core network node via a first access network node and an aggregation network node. The core network node can associate with the native multicast group a second client device that is associated with a second VLAN and operatively coupled to the core network node via a second access network node and the aggregation network node. The core network node can define a multicast VLAN including the first VLAN and the second VLAN based on the native multicast group. The core network node can receive a multicast data unit associated with the native multicast group and can also define a single instance of the multicast data unit for the multicast VLAN.

DETAILED DESCRIPTION

Figures 1, 2:
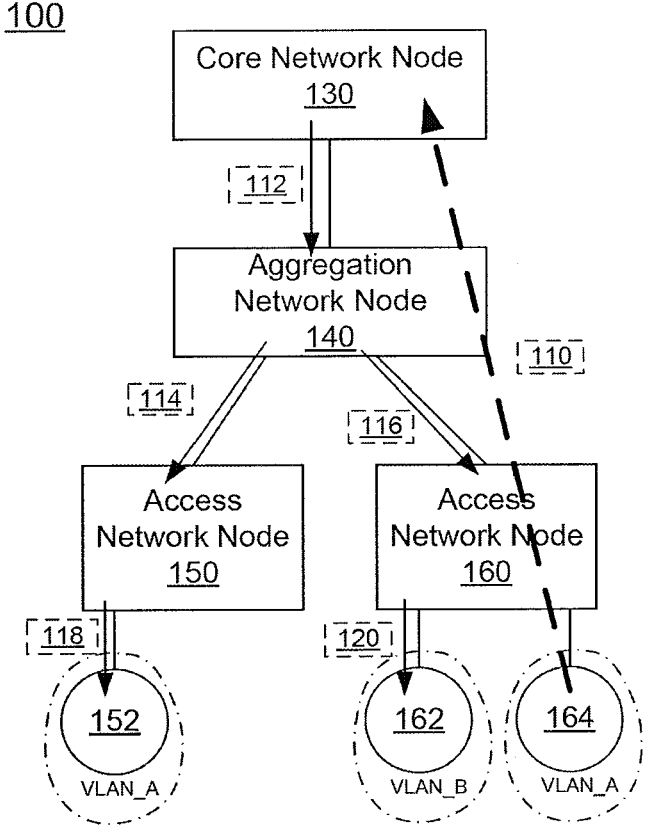
FIG. 1 is a schematic illustration of a network, according to an embodiment.
FIG. 2 is a schematic illustration of a multicast VLAN identifier table implemented in (or accessible to) a core network node, according to an embodiment.

In some embodiments, an apparatus includes a core network node configured to associate with a native multicast group a first client device that is associated with a first virtual local area network (VLAN) and operatively coupled to the core network node via a first access network node and an aggregation network node. The core network node is configured to associate with the native multicast group a second client device that is associated with a second VLAN and operatively coupled to the core network node via a second access network node and the aggregation network node. The core network node is configured to define a multicast VLAN including the first VLAN and the second VLAN based on the native multicast group. The core network node is configured to receive a multicast data unit associated with the native multicast group. The core network node is also configured to define a single instance of the multicast data unit for the multicast VLAN.

In some embodiments, a non-transitory processor-readable medium includes code to cause a processor to send to a core network node a request to associate with a native multicast group a first client device that is associated with a first virtual local area network (VLAN). The code causes the processor to send to the core network node, a request to associate with the native multicast group a second client device that is associated with a second VLAN. The code further causes the processor to receive from the core network node, a first instance of a data unit associated with the native multicast group and to be sent to a set of client devices associated with a multicast VLAN including the first VLAN and the second VLAN. The code also causes the processor to define a second instance of the data unit and a third instance of the data unit based on the first instance of the data unit, and send the second instance of the data unit to the first client device based on the first client device being associated with the multicast VLAN. The code further causes the processor to send the third instance of the data unit to the second client device based on the second client device being associated with the multicast VLAN. In such embodiments, the code is included in the non-transitory processor-readable medium of the access network node. Note that the multiple copies of the data unit are generated at the access network node only when the first request and the second request are sent from the same access network node.

In some embodiments, an apparatus includes a core network node configured to associate with a first native multicast group a first client device that is associated with a virtual local area network (VLAN) and operatively coupled to the core network node via an access network node and an aggregation network node. The core network node can associate with a second native multicast group a second client device associated with the VLAN and operatively coupled to the core network node via the access network node and the aggregation network node. In some instances, the core network node can define a multicast tunnel associated with the first native multicast group and the second native multicast group. In other instances, the core network node can define a first multicast tunnel associated with the first native multicast group and a second multicast tunnel associated with the second native multicast group. The core network node can also receive a first multicast data unit associated with the first native multicast group and a second multicast data unit associated with the second native multicast group. The core network node can send the first multicast data unit and the second multicast data unit to the access network node via the multicast tunnel (either one or two multicast tunnels as described above). The access network node sends the first multicast data unit to the first client device based on the first client device being associated with the VLAN and the first native multicast group. The access network node also sends the second multicast data unit to the second client device based on the second client device being associated with the VLAN and the second native multicast group.

A native multicast group is a listing of client devices that are configured or authorized to receive multicast signals or multicast data units from a source device across, for example, multiple VLANs (and multiple multicast VLANs). For example, a native multicast group can include all client devices that receive multicast data units associated with ESPN programming (from an ESPN source server), CNN programming (from a CNN source server), or HBO programming (from an HBO source server), across multiple VLANs and multiple multicast VLANs. A multicast VLAN can include multiple client devices and these multiple client devices need not receive the same multicast signals or multicast data units. In other words, a multicast VLAN can include client devices that are associated with different native multicast groups.

As used in this specification, the singular forms "a," "an" and "the" include plural referents unless the context clearly dictates otherwise. Thus, for example, the term "a client device" is intended to mean a single client device or a combination of client devices.

FIG. 1 is a schematic illustration of a network 100, according to an embodiment. The network 100 includes a core network node 130, an aggregation network node 140, access network nodes 150 and 160, and client devices 152, 162, and 164. In some embodiments, the network 100 shown in FIG. 1 is a converged enterprise network. In such a converged enterprise network, any network node included in the enterprise network can be controlled by one or more core network nodes. Additionally, in some embodiments, a common tunneling technology can be used to forward both the wired traffic and the wireless traffic to any portion of the converged enterprise network.

Figure 7:
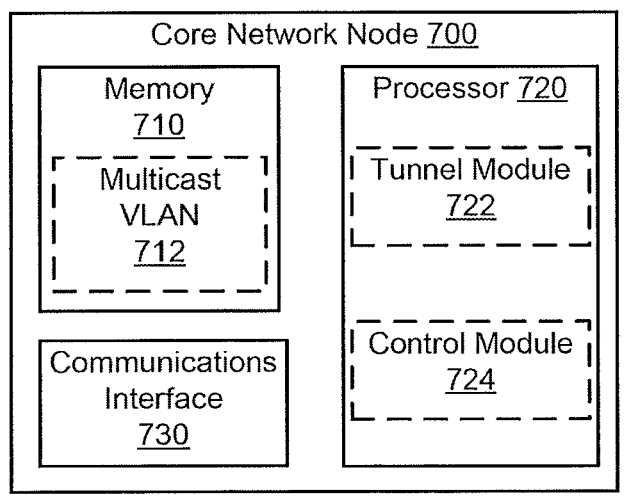
FIG. 7 is a system block diagram of a core network node, according to an embodiment.

The core network node 130 in the network 100 can be a single device that combines for example the functionality of a switch, a router, and a controller, and that can include one or multiple control module(s) (e.g., the control module 724 for core network node 700 as shown in FIG. 7 discussed below) configured to manage wired/wireless network nodes and/or wired/wireless user sessions. The core network node 130 can establish a wired session with an access network node (150 and 160) through intervening wired network nodes, via a unicast or multicast tunnels (e.g., Generic Routing Encapsulation (GRE) tunnels or Control and Provisioning of Wireless Access Points (CAPWAP) tunnels) that can pass both data-plane data units and/or control-plane data units. In some instances, a core network node 130 in the network 100 can be referred to as a core SRC (switch, router, and controller).

The core network node 130 can be configured to manage a native multicast group (e.g., native multicast groups associated with ESPN programming, CNN programming, BBC news programming, HBO programming, etc.). The core network node 130 can associate with the native multicast group a first client device 162 that is associated with a first virtual local area network (VLAN) (e.g., VLAN_B in FIG. 1) and operatively coupled to the core network node 130 via a first access network node 160 and an aggregation network node 140. The core network node 130 can also associate with the native multicast group a second client device 152 that is associated with a second VLAN (e.g., VLAN_A in FIG. 1) and operatively coupled to the core network node 130 via a second access network node 150 and the aggregation network node 140. The core network node can associate the client devices (152, 162, 164) with a native multicast group based on the Internet Group Management Protocol (IGMP) join request or the Multicast Listener Discovery (MLD) join request.

In some instances, the core network node 130 can define a multicast VLAN including the first VLAN (VLAN_B) and the second VLAN (VLAN_A). A multicast VLAN (mVLAN) is an aggregation (or grouping) of VLANs such that a client device in a member VLAN (within the mVLAN) is managed as a client device in the mVLAN by the core network node 130. In such instances, the core network node 130 can be configured to define a multicast tunnel associated with one or more native multicast groups, where the subscribers (or client devices) of the native multicast groups may or may not be associated with the mVLAN.

In some instances, the core network node 130 can be configured to receive a multicast data unit associated with a native multicast group (e.g., a multicast data unit from a network not shown in FIG. 1). In such instances, the core network node 130 can define a single instance of the multicast data unit for the mVLAN (e.g., data unit 112 in FIG. 1) that is a first instance of the multicast data unit. The core network node can send the first instance of the multicast data unit 112 to the aggregation network node 140 via a multicast tunnel associated with the mVLAN such that the aggregation network node 140 defines, based on the first instance of the multicast data unit 112, a second instance of the multicast data unit 116 and a third instance of the multicast data unit 114. The aggregation network node 140 can send the second instance of the multicast data unit 116 to the first access network node 160 based on the first client device 162 being associated with the mVLAN, and send the third instance of the multicast data unit 114 to the second access network node 150 based on the second client device 152 being associated with the mVLAN. In such instances, the first client device 162 receives a fourth instance of the multicast data unit 120 defined by the first access network node 160 for VLAN_B based on the second instance of the multicast data unit 116, and the second client device 152 receives a fifth instance of the multicast data unit 118 defined by the second access network node 150 for VLAN_A based on the third instance of the multicast data unit 114.

In other instances, the core network node 130 can be configured to associate with the multicast group a third client device 164 that is associated with the second VLAN (VLAN_A) and operatively coupled to the core network node 130 via the first access network node 160 and the aggregation network node 140. Hence, in such instances, the core network node 130 can send the first instance of the multicast data unit to the aggregation network node 140 such that the first client device 162 receives a fourth instance of the multicast data unit 120 defined by the first access network node 160 based on the second instance of the multicast data unit 116, and the third client device receives a fifth instance of the multicast data unit (not numbered in FIG. 1) defined by the first access network node 160 based on the second instance of the multicast data unit 116.

In yet other instances, the core network node 130 can also be configured to receive a unicast or multicast data unit (e.g., data unit 110 in FIG. 1) from the third client device 164 via a unicast tunnel defined between the first access network node 160 and the core network node 130 (see bold dashed arrow in FIG. 1). For the case of a multicast data unit received from the third client device 164, the core network node can send the first instance of the multicast data unit 112 to the aggregation network node 140 such that the aggregation network node 140 defines, based on the first instance of the multicast data unit 112, a second instance of the multicast data unit 116 and a third instance of the multicast data unit 114. The aggregation network node 140 can send the second instance of the multicast data unit 116 to the first access network node 160 based on the first client device 162 being associated with the mVLAN, and send the third instance of the multicast data unit 114 to the second access network node 150 based on the second client device 152 being associated with the mVLAN. In such instances, the first client device 162 receives a fourth instance of the multicast data unit 120 defined by the first access network node 160 for VLAN_B based on the second instance of the multicast data unit 116, and the second client device 152 receives a fifth instance of the multicast data unit 118 defined by the second access network node 150 for VLAN_A based on the third instance of the multicast data unit 114.

The aggregation network node 140 can multiplex client traffic such as data units of wired and wireless sessions, to core network node 130 without the need for local switching or complex forwarding and classification functionality. For example, aggregation network node 140 does not need to be configured to switch or route a data unit received from access network node 160 that is destined for another access network node based on a destination address included in the data unit. Instead, aggregation network node 140 can be configured to forward the data unit, through a portion of a tunnel (shown by the bold dashed arrow in FIG. 1) between access network node 160 and core network node 130, to core network node 130, from where the data unit can be further switched or routed to the destination device. For the case of multicast data transmission, the aggregation network node 140 can receive a multicast data unit from the core network node, make one or multiple copies or instances of the data unit according to instructions sent by the core network node 130 and/or instructions included in the header of the multicast data unit and send one or multiple copies of the data unit to the respective access network nodes.

In some instances, the access network nodes 150 and/or 160 can be any device that can connect one or more wired client devices to the network 100 via a wired link and can be, for example, a hub, an Ethernet switch, etc. In such instances, the access network nodes 150 and 160 can also be known as an access switch, a network switch, or a switching hub. As described in detail herein, the access network node 150 and 160 delivers data units between one or more wired client devices, and/or one or more (wireless) access points that are operably coupled to the access network node 150 and 160.

In other instances, access network node 150 and/or 160 can be an access point. An access point can be any device that connects a wireless client device to a wired portion of the network using, for example, Wireless Fidelity (Wi-Fi), Bluetooth or other wireless communication standards. In some cases, an access point can be located on the same device together with a wired access network node such as, for example, a wired Ethernet router equipped with a wireless transceiver. In other cases, an access point can be a stand-alone device such as, for example, a wireless access point (WAP) or a Wireless Termination Point (WTP).

The access network node 150 and/or 160 terminate the multicast tunnels established between the core network node 130 and the endpoints of an mVLAN and forward data units to the client devices 152, 162, 164. The access network nodes 150 and 160 can receive from client devices (e.g., a first client device 162, a second client device 152) a request signal to associate the client devices with a native multicast group that can be at least one of an Internet Group Management Protocol (IGMP) join request signal or a Multicast Listener Discovery (MLD) join request signal. The access network node 160 can send to the core network node 130 a request signal to associate with a native multicast group, a first client device (e.g., client device 162) that is associated with a first VLAN (e.g., VLAN_B). The access network node 150 can send to the core network node 130 a request signal to associate with a native multicast group, a second client device (e.g., client device 152) that is associated with a second VLAN (e.g., VLAN_A). The access network nodes 150 and 160 can receive from the core network node 130 a first instance of a data unit via a multicast tunnel that is associated with the native multicast group and to be sent to a set of client devices associated with a multicast VLAN (mVLAN) including the first VLAN (VLAN_B) and the second VLAN (VLAN_A). The access network nodes 150 and 160 can define (or generate) a second instance (or copy) of the data unit associated with VLAN_B and a third instance (or copy) of the data unit associated with VLAN_A, respectively, based on the first instance of the data unit (received from the core network node 130). The access network node 160 can send the second instance of the data unit to the first client device 162 based on the first client device 162 being associated with the multicast VLAN. The access network node 150 can send the third instance of the data unit to the second client device 152 based on the second client device 152 being associated with the multicast VLAN.

In some instances, the client devices 152, 162 or 164 can be any wired client device. A wired client device 152, 162, or 164 can be, for example, any device that can receive data units from and/or send data units to an access network node 150 or 160 through a wired connection, such as, for example, a desktop computer, a laptop computer, a workstation, a printer, etc. In other instances, the client devices 152, 162 or 164 can be any wireless client device. A wireless client device can be, for example, any device that can receive packets from and/or send packets to a wireless access point through wireless technology such as, for example, a Wireless Fidelity (WiFi), cellular technologies such as, for example, third generation mobile telecommunications (3G), fourth generation mobile telecommunications (4G), Global System for Mobile Communication (GSM), and/or the like. Examples of wireless client devices include a mobile phone, a Wi-Fi enabled laptop computer, a Bluetooth earphone, a personal digital assistant (PDA), a standard mobile telephone, a tablet personal computer (PC), and/or the like.

As discussed above and shown in FIG. 1, a multicast VLAN (mVLAN) is an aggregation (or grouping) of VLANs in the sense that a multicast client device in a member VLAN within an mVLAN is managed as a client device in the mVLAN. mVLANs are dynamically created or defined at the core network node. The core network node stores assignments, associations, or subscription information regarding the native multicast group at the mVLAN level (and not at the individual member VLAN level) and thus generates or defines a single copy of a multicast data unit for each mVLAN and sends the multicast data unit into the multicast tunnels towards the access network node. This allows the core network node to send only a single copy of the multicast data unit for multiple member VLANs (that are grouped with an mVLAN) through the multicast tunnel.

As also discussed above and shown in FIG. 1, multicast tunnels are created or defined dynamically between the core network node and the access network nodes based on the subscription into native multicast groups by client devices at the access nodes. Introduction of on-demand multicast tunnel production or definition can allow copies of multicast data units to reach an access network node only when a client device is associated with the access network node and has subscribed to the native multicast group. Hence, the use of multicast tunnels (as opposed to using unicast tunnels) can significantly reduce bandwidth wastage when copies of multicast data units traverse over physical links in a campus or enterprise network infrastructure.

In summary, introduction of mVLANs can ameliorate the problem of sending copies of multicast data units for each VLAN through a network such as a campus or enterprise network infrastructure. The multicast tunnels can also be setup within a network. Hence, multiple copies of the multicast data units do not have to be sent when client devices belonging to different VLANs (but within the same mVLAN) roam from one portion of the network to another.

FIG. 2 is a schematic illustration of a multicast VLAN identifier table 200 implemented in (or accessible to) a core network node (or a host core device), according to an embodiment. The multicast VLAN identifier table 200 can be similar to or part of the multicast VLAN module 712 in FIG. 7 discussed below. The core network node (or host core device) within which the multicast VLAN identifier table 200 is implemented can be similar to the core network node 130 in FIG. 1 and core network nodes 321 and 322 in FIG. 3 discussed below. The multicast VLAN identifier table 200 has two columns, shown as multicast VLAN 220 and VLAN members 240 respectively. Each entry (i.e., row) of the multicast VLAN identifier table 200 defines an identifier associated with a multicast VLAN (mVLAN) controlled (or managed) by the core network node and the VLAN identifiers associated with each member VLAN within an individual mVLAN.

Specifically, the first column, multicast VLAN 220, contains multicast VLAN identifiers. In the example shown in FIG. 2, only one multicast VLAN is listed and the identifier associated with the multicast VLAN is 1. A multicast VLAN identifier can be, for example, a number, a text string, a symbol, a binary data or data in any other suitable format that can be used to uniquely identify a multicast VLAN. The second column, VLAN members 240, includes an identifier associated with each member VLAN within an individual mVLAN. Similar to the identifier of the multicast VLAN, a VLAN member identifier can be, for example, a number, a text string, a symbol, a binary data or data in any other suitable format that can be used to uniquely identify the different VLANs within an individual mVLAN. In the example shown in FIG. 2, two VLANs namely, VLAN_A and VLAN_B, are associated with mVLAN 1.

Figure 3:
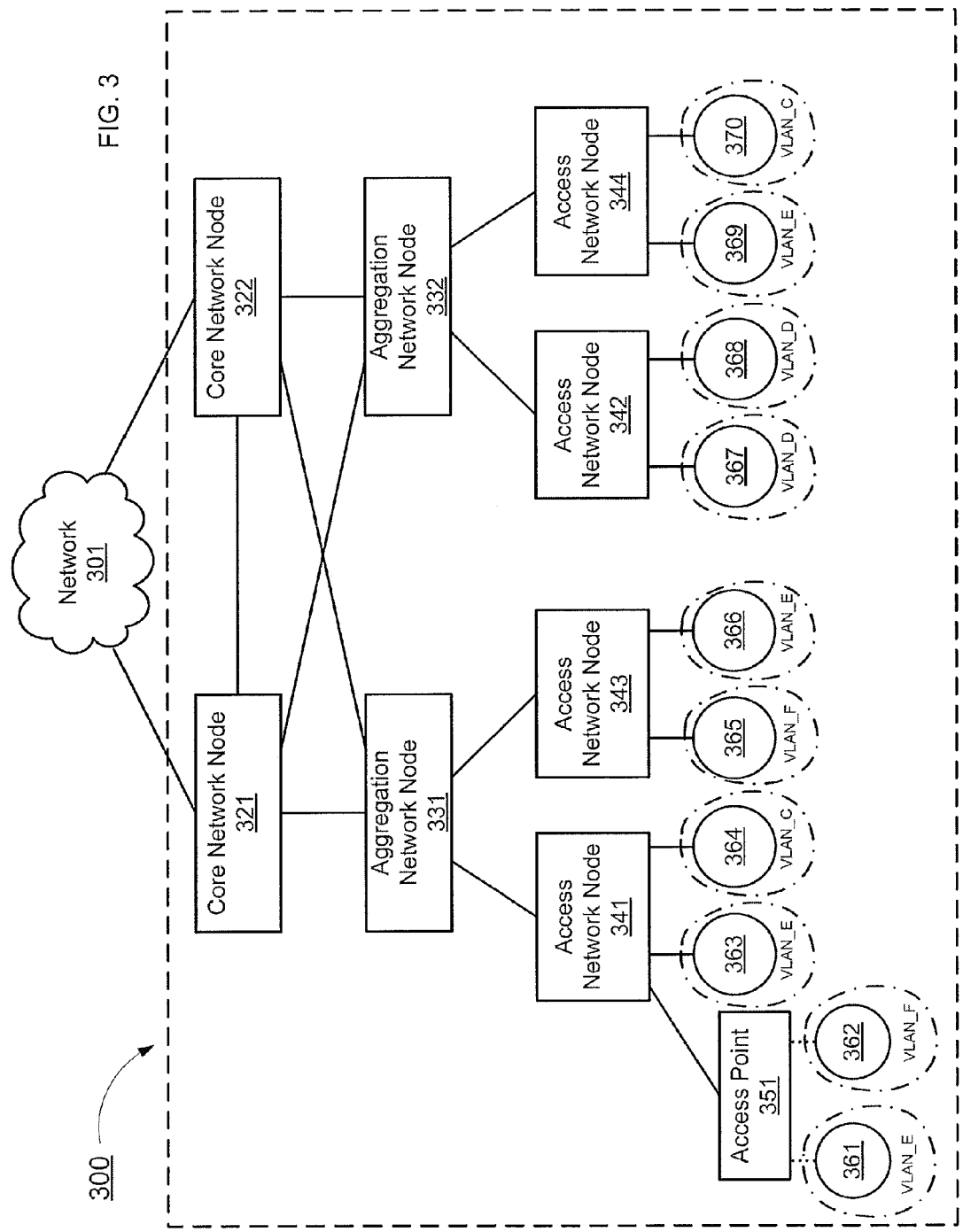
FIG. 3 is a schematic illustration of a network having multiple core network nodes (core devices), according to an embodiment.

FIG. 3 is a schematic illustration of a network 300 having multiple core network nodes (core devices), according to an embodiment. The network 300 includes an access point (e.g., access point 351), multiple access network nodes (e.g., access network nodes 341, 342, 343 and 344), aggregation network nodes (e.g., aggregation network nodes 331, 332) and core network nodes (e.g., core network nodes 321, 322). The access network nodes can be directly and/or operatively coupled to one or more wired client devices (e.g., wired client devices 363, 364, 365, 366, 367, 368, 369, and 370). The access point 351 can be directly and/or operatively coupled to one or more wireless client devices (e.g., wireless client devices 361 and 362). The core network nodes 321 and 322 are configured to couple the remaining devices within the network 300 to one or more external networks (e.g., network 301). The core network nodes 321 and 322 communicate with the external network(s) (e.g., network 301) by transmitting data units to and/or receiving data units from router(s) and/or other core devices within the external network(s).

In the embodiment shown in FIG. 3, the network 300 is a converged network having functionalities of both a wireless network (e.g., a wireless local area network (WLAN)) and a wired network (e.g., an Ethernet). Specifically, access network nodes 341-344 can be any device that can directly connect one or more wired client devices 363-370 to the network 300 via a wired link. In such cases, the access network nodes 341-344 can be known as an access switch, a network switch, or a switching hub. Access point 351 can be any device that connects a wireless client device 361 and 362 to a wired network 300 using, for example, Wireless Fidelity (Wi-Fi), Bluetooth or other wireless communication standards. In such cases, the access point 351 can be, for example, a wireless access point (WAP) or a Wireless Termination Point (WTP). In such embodiments, the network 300 can be similar to the converged homogeneous enterprise networks shown and described in U.S. patent application Ser. No. 13/252,852, filed Oct. 4, 2011 and entitled "Methods and Apparatus for a Converged Wired/Wireless Enterprise Network Architecture," which is incorporated herein by reference in its entirety.

The network 301 can be any network that is directly or operatively coupled to the network 300 through one or more routers (not shown in FIG. 3) or any other core or intermediary devices. For example, the network 301 can be a data center network including one or more data servers that provide information services. In another example, the network 301 can be a Wide Area Network (WAN) that is used to connect the network 300 to remote data resources. In yet another example, the network 301 can be the Internet. As such, the network 300 can act as an access network providing, for wired or wireless client devices within the network 300, access to data resources, applications, and information services that are located at or provided from network 301.

An access network node (e.g., the access network node 341-344) can be any device that can operatively and/or directly connect one or more wired client devices 363-370 to the network 300 via a wired link and can be, for example, an access switch, a network switch, or a switching hub. The access network nodes 341-344 can be configured to deliver data units between one or more aggregation nodes (e.g., the aggregation nodes 331, 332) and one or more wired client devices 363-370 or wireless client devices 361-362 (via the access point 351).

An aggregation network node (e.g., the aggregation network node 331, 332) can be any device that is used to aggregate multiple access network nodes and to switch or route data units within the network 300, such as a router, a layer-3 switch, etc. Furthermore, the aggregation network node 331-332 can be configured to transmit data units between one or more access network nodes and one or more core network nodes that are connected to the aggregation network nodes 331-332. In some configurations, as described below, an aggregation network node 331-332 can be configured to transmit data units between an access network node 341-344 and a core network node 321-322 using a (unicast or multicast) tunnel connecting the access network node 341-344 and the core network node 321-322 through the aggregation network node 331-332.

A core network node (e.g., the core network node 321, the core network node 322) can be a high-capacity switching device positioned in the physical core, or backbone, of the network 300. The core network nodes 321-322 can be configured to connect to the access network nodes (e.g., the access network nodes 341-344) via the aggregation network nodes 331-322 (e.g., the aggregation network nodes 331 and 332), such that access to devices and information services (e.g., persistent data and applications) located at other external networks (e.g., the network 301) can be provided to the client devices 361-370 coupled to the network 300. In some cases, a core network node is also known as a core switch, a tandem switch or a backbone switch.

In some instances, a core network node 321-322 for a converged network 300 (i.e., a network having functionalities of both a wireless network and a wired network) can be a single device that combines the functionalities of, for example, a switch, a router, and a controller. Such a core network node 321-322 can be configured to manage both wired network nodes (e.g., Ethernet switches) and wireless network nodes (e.g., WAPs), as well as wired and wireless user sessions. In some instances, a core network node in a converged network can also be referred to as a core SRC (switch, router, and controller).

In some instances for converged network 300, the core network nodes 321 and 322 can provide routing services (e.g., acting as a virtual router) and thus can be configured to direct traffic (e.g., data-plane data units, control-plane data units) sent from and/or destined to other devices within the network 300. In such instances, the core network nodes 321 and 322 can be configured to connect the network 300 with other external network(s) 301. The core network nodes 321 and 322 can send downstream traffic received from the other external network(s) to the devices within the network 300, and/or send upstream traffic received from the devices within the network 300 to the external network(s) (here upstream traffic and downstream traffic are identified with respect to the devices in the network 300).

In some instances, a unicast tunnel or a multicast tunnel can be established, and used to transmit data units, between the core network nodes 321-322 and access network nodes 341-344 and/or the access point 351 through one or more intervening nodes (e.g., aggregation network nodes 331-332). Such a tunnel can be, for example, an Ethernet-over-layer-3 tunnel (e.g., a control and provisioning of wireless access points (CAPWAP) tunnel), a generic routing encapsulation (GRE) tunnel), a multiprotocol label switching (MPLS) tunnel, etc. In such instances, for the case of a unicast tunnel, the intervening nodes can be configured to forward data units based on the corresponding unicast tunneling protocol. In such instances, for the case of a multicast tunnel, the intervening nodes can be configured to replicate data units and then forward the replicated data units based on the corresponding multicast tunneling protocol. In the example of FIG. 3, the core network node 321 can be configured to transmit data units to and receive data units from the access network nodes 341 and 343 using a tunnel (not shown in FIG. 3) that connects the core network node 321 and the access network nodes 341 and 343 through the aggregation network node 331.

In some instances, a core network node (e.g., core network node 321 in FIG. 3) can associate with a native multicast group a first client device (e.g., client device 365 in FIG. 3) that is associated with a first virtual local area network (VLAN) (e.g., VLAN_F) and operatively coupled to the core network node 321 via a first access network node (e.g., access network node 343) and an aggregation network node (e.g., aggregation network node 331). The core network node 321 can also associate with the native multicast group a second client device (e.g., client device 363) that is associated with a second VLAN (e.g., VLAN_E) and operatively coupled to the core network node 321 via a second access network node 341 and the aggregation network node 331. The core network node 321 can define a multicast VLAN including the first VLAN (VLAN_F) and the second VLAN (VLAN_E). As described above, a multicast VLAN (mVLAN) is an aggregation (or grouping) of VLANs such that a multicast client device in a member VLAN (within the mVLAN) is considered as a client device in the mVLAN by the core network node 321.

In such instances, the core network node 321 can also define a multicast tunnel associated with one or more native multicast groups (the client devices or subscribers of the different native multicast groups can be spread across multiple mVLANs). A multicast tunnel can transmit multicast data through the multicast tunnel, which results in copies to be defined based on a multicast Destination IP Address in an outer IP header using an IP Multicast Protocol. A multicast tunnel can receive an instance (or copy) of a multicast data unit from a core network node (e.g., core network node 321 or 322 in FIG. 3). In some instances, the multicast tunnel can be configured to transmit the multicast data units through intermediate devices within the tunnel to the appropriate access network nodes. In other instances, the intermediate devices such as aggregation network nodes and/or access network nodes can replicate the multicast data units to generate additional copies of the multicast data units to deliver the data unit to the different client devices that are designated as receivers of the multicast data unit. The multicast tunnels are created or defined dynamically based on the subscription into the native multicast groups by client devices at the access network nodes. Introduction of multicast tunnels (as opposed to using unicast tunnels) can overcome the problem of wastage of network bandwidth when unicast copies of multicast data units traverse over physical links. The creation or definition of on-demand multicast tunnels can send copies of multicast data units to reach an access network node when there is a client device operatively coupled to the access network node that is a designated receiver of the multicast data unit and not send copies of the multicast data units when a client device is not so operatively coupled. The core network node 321 can receive a multicast data unit associated with the native multicast group. The core network node can also define a single instance of the multicast data unit for the multicast VLAN.

In some instances, the core network node (e.g., core network node 322 in FIG. 1) can associate with a first native multicast group a first client device (e.g., client device 367 in FIG. 3) that is associated with a virtual local area network (VLAN) (e.g., VLAN_D in FIG. 3) and operatively coupled to the core network node 322 via an access network node (e.g., access network node 342) and an aggregation network node (e.g., aggregation network node 332). The core network node 322 can associate with a second native multicast group a second client device (e.g., client device 368 in FIG. 3) associated with the VLAN (VLAN_D) and operatively coupled to the core network node 322 via the access network node 342 and the aggregation network node 332. In some instances, the core network node 322 can define a multicast tunnel associated with the first native multicast group and the second native multicast group. In other instances, the core network node 322 can define a first multicast tunnel associated with the first native multicast group and a second multicast tunnel associated with the second native multicast group. The core network node 322 can also receive a first multicast data unit associated with the first native multicast group and a second multicast data unit associated with the second native multicast group. The core network node 322 can send the first multicast data unit and the second multicast data unit to the access network node 342 via the multicast tunnel (either one or two multicast tunnels as described above). The access network node 342 sends the first multicast data unit to the first client device 367 based on the first client device 367 being associated with the VLAN (VLAN_D) and the first native multicast group. The access network node 342 also sends the second multicast data unit to the second client device 368 based on the second client device 368 being associated with the VLAN (VLAN_D) and the second native multicast group. For example, the first multicast group can be a listing of client devices receiving multicast data units representing CNN programming and the second multicast group can be a listing of client devices receiving multicast data units representing ESPN programming. In the case of a weather emergency (e.g., an impeding hurricane), the core network node 322 can receive and send multicast data units representing, for example, emergency weather reports, that are associated with both the first native multicast group and the second native multicast group via the multicast tunnel (i.e., both CNN and ESPN subscribers will receive the multicast data units representing the emergency weather reports).

In such instances, the VLAN discussed above (e.g., VLAN_D in FIG. 3) is a first VLAN and the access network node 342 is a first access network node. The core network node 322 can define a multicast VLAN (mVLAN) that includes the first VLAN (VLAN_D) and one or more additional VLANs (e.g., VLAN_A, VLAN_B, VLAN_C, VLAN_E, and/or VLAN_F) and also dynamically create (or define) a multicast tunnel to be associated with the mVLAN. The core network node 322 can also send the first instance (or copy) of the multicast data unit to the aggregation network node (e.g., aggregation network node 332 in FIG. 3) such that the aggregation network node 332 (1) defines based on the first instance of the multicast data unit a fourth instance of the multicast data unit and (2) sends the fourth instance of the multicast data unit to a second access network node (e.g. access network node 344 in FIG. 3) coupled to a third client device (e.g., client device 369 in FIG. 3) associated with the second VLAN (e.g., VLAN_E in FIG. 3).

Implemented in a converged network, the core network nodes of the network 300 can provide a single point of configuration and management, and a single anchoring point, for all network services as well as a single logic point of interaction for authentication, visibility and monitoring applications. As a result, various types of services can be aggregated and/or consolidated at one or more core network nodes, such as definition of virtual local area networks (VLANs), definition of multicast virtual local area networks (mVLANs), firewall, intrusion detection policy (IDP), virtual private network (VPN) termination, load balancing, and/or the like. Particularly, core network nodes in the network 300 can be used as anchoring points for enforcing a centralized downstream policy for each mVLAN, implementing and managing downstream sessions for each mVLAN, and transmitting mVLAN traffic, as described in detail below. The mVLANs can be anchored and load balanced among core network nodes using policies similar to the case of VLAN load balancing as shown and described in U.S. patent application Ser. No. 13/627,622, filed Sep. 26, 2012 and entitled "Methods and Apparatus for Load Balancing VLAN Traffic," which is incorporated herein by reference in its entirety. As a result of anchoring mVLANs, the downstream mVLAN traffic can be directed toward a specific core network node. This technique is similar to the VLAN case (as mentioned above), whereby downstream unicast traffic is directed towards a specific core device (such as a core network node) with VLAN anchoring.

In a converged network such as the network 300, a given VLAN can include multiple devices (e.g., client devices, access network nodes) across the network. For example, a VLAN (e.g., VLAN_E in FIG. 3) can include the client devices 361, 363, 366, 369, the access network nodes 341, 343, 344 and the access point 351. Another VLAN (e.g., VLAN_F in FIG. 3) can include the client devices 362, 365, the access network nodes 341, 343, and the access point 351. Similarly, the core network node 321 can define a multicast VLAN (mVLAN) to include VLAN_E and VLAN_F. In such instances, the devices associated with the mVLAN will include, for example, client devices 361, 363, 366, 369, 362, 365, the access network nodes 341, 343, 344, and the access point 351. In such instances, communication sessions associated with an mVLAN can be identified by, for example, an mVLAN identifier that is uniquely designated to that mVLAN. Specifically, each data unit (e.g., data packet, data cell, data frame) from a communication session of the mVLAN (e.g., destined to and/or sent from a device associated with the mVLAN) can be tagged by the mVLAN identifier included in the data unit. As a result, an intermediary device (e.g., a routing device, a switching device) such as an aggregation network node can determine, based on the mVLAN identifier included in the data unit, that the data unit is associated with a particular mVLAN.

In some instances, the mVLAN identifier for an mVLAN can be assigned by the core network node during definition of the mVLAN. The mVLAN identifier can be added to the header of the (multicast) data units destined for members of an mVLAN by the core network node when downstream traffic associated with an mVLAN is received by the core network node from an external network 301 and/or router (not shown in FIG. 3). The mVLAN can be determined at, for example, the core network node based on the destination address (e.g., a destination IP address) within the data unit. The multicast data unit including the mVLAN identifier is then sent from the core network node via one or multiple multicast tunnels to the access network nodes (and/or access points) that are operably coupled to the client devices that are designated as receivers of the multicast data units.

In some instances, core network nodes 321-322 in the network 300 can be designated as anchoring points for mVLANs. Specifically, a first core network node can be designated as a master device for an mVLAN, and a second core network node can be designated as a back-up device for that mVLAN. As described in detail below, the core network node designated as the master device for an mVLAN can function as a primary anchor for that mVLAN, and the core network node designated as the back-up device for an mVLAN can function as a back-up anchor for that mVLAN.

The core network nodes (e.g., 321 and/or 322 in FIG. 3) can be designated as anchoring points for mVLANs in various methods. In some instances, for example, a control device (not shown in FIG. 3) can perform the designating function (i.e., designate a core network node as a master device and a core network node as a back-up device for each mVLAN) by implementing one or multiple specific mVLAN-load-distribution methods. The control device can then send a signal to each designated core network node with instructions for that core network node to be appropriately configured. In response to the signal, a designated core network node can be configured based on the instructions such that the core network node can function as a master device or a back-up device for the mVLAN. In some other instances, for example, the designating function can be performed manually by an administrator of the network 300.

In other instances, core network nodes can be designated as anchoring points for mVLANs based on various considerations such as, for example, traffic load on a core network node, number of active sessions in a VLAN, physical and/or logical distance between a core network node and devices of a mVLAN, and/or the like. For example, a core network node with a light traffic load has a higher probability to be designated as a master device for a newly-defined mVLAN; while a core network node with a heavy traffic load has a higher probability to be designated as a back-up device for a newly-defined mVLAN. In another example, a core network node with a larger capacity can be designated as a master device for an mVLAN with a large number of active sessions; while a core network node with a smaller capacity can be designated as a master device for an mVLAN with a small number of active sessions.

In some instances, a core network node can be designated as a master device or a back-up device for more than one mVLAN at the same time. In one example, an arbitrary number of mVLANs can be dynamically load-balanced among core network nodes. That is, depending on changes in the traffic load, the number of active sessions in an mVLAN and/or other factors, a core network node can be dynamically designated or de-designated as an anchoring point (e.g., master device, back-up device) for an mVLAN.

Additionally, in some other instances, the information associated with a core network node being designated as the master device for an mVLAN can be distributed to all the access network nodes of the each VLAN included in the mVLAN, such that the identity of the master device is available at each access node of the mVLAN. In some cases, the core network node upon being designated as the master device for an mVLAN, can send a multicast message that is destined to reach each access network node of every VLAN included in the mVLAN. In other cases, the information can be distributed to every access network nodes of the mVLAN in any other suitable means such as being distributed by a control device or an administrator of the network 300.

After being designated as the master device for an mVLAN, a core network node is responsible for both forwarding traffic for that mVLAN and advertising subnet routes for all the VLANs included in the mVLAN. Thus, all upstream devices (e.g., upstream routers not shown in FIG. 3 but included in network 301) can receive information of subnet routes for any of the VLANs associated with an mVLAN only from the master device for that mVLAN. The upstream devices can route downstream traffic for an mVLAN based on the received subnet routes for all the VLANs included in a particular mVLAN using any number of routing protocols such as, for example, Equal-Cost Multi-Path (ECMP) routing. As a result, the upstream devices can send all the downstream traffic for any of the VLANs included in an mVLAN to the core network node designated as the master device for the mVLAN. Furthermore, the core network node designated as the master device can forward the received downstream traffic for the mVLAN to the destined access network node via the appropriate multicast tunnel. Thus, all downstream sessions for each VLAN included in an mVLAN are anchored at a respective single core network node that functions as the master device for that mVLAN. This allows for a simple centralized downstream policy for each mVLAN and its downstream sessions to be implemented and enforced at that single core network node. In addition, as described above, the downstream traffic can be sent from the master device to an access node using a multicast tunnel through intermediate device(s) (e.g., an aggregation node).

In some instances, a core device designated as the back-up device for an mVLAN can provide redundancy to the anchoring functionality (e.g., traffic forwarding, route advertising) for the master device of the mVLAN. Specifically, if the master device of the mVLAN fails to perform the anchoring functionality (e.g., unable to forward upstream traffic, unable to advertise subnet routes) for the mVLAN because, for example, a link breaks down, a connection is lost, the core network node is damaged, the master device can be de-designated, and the back-up device of the mVLAN can be designated as the new master device and start to perform the anchoring functionality. In some cases, if the core network node de-designated from the master device role is capable of functioning as a back-up device for the mVLAN, that core network node can be designated as the new back-up device for the mVLAN. Otherwise if the core network node de-designated from the master device role is not capable of functioning as a back-up device for the mVLAN (e.g., the core network node is damaged), a third core network node can be (temporarily) designated as the new back-up device for the mVLAN.

The network 300 discussed in FIG. 3 allows the grouping of VLANs in an mVLAN to be arbitrary when an mVLAN contains member VLANs anchored to one virtual router (e.g., Virtual Router and Forwarding Instances—VRF) and not other virtual routers. This solves the problem where client devices can receive data units from sources operatively coupled to other (or multiple) virtual routers (or VRFs). Thus, in some embodiments, an mVLAN can include all the VLANs associated with a virtual router (or VRF). In such embodiments there is a 1:1 relationship between mVLANs and VRFs (i.e., there is only one assigned mVLAN per VRF). Multiple mVLANs per VRF can lead to multiple replications of a given multicast data unit. Additionally, mVLANs can be associated with a single VRF to avoid address space collision between individual VRFs.

In some embodiments, one or more multicast tunnels can be associated with a given mVLAN. Each multicast tunnel can also be associated with one or more native multicast groups. Allowing for multiple multicast tunnels per mVLAN where a given native multicast group can map to a multicast tunnel allows the enterprise to control the data traffic that is sent to (or received by) each access network node in a highly controlled manner.

In some instances, all native multicast groups (e.g., CNN, ESPN, HBO, ABC, CBS, etc.) can be associated with a single multicast tunnel. In such instances, the core network node can send all the multicast data units (or multicast traffic) to all the access network nodes associated with the multicast tunnel even if the access network nodes are not connected to any client devices that subscribe to that native multicast group. In such instances, there will be unnecessary copies of the multicast data units that traverse over the physical links in the enterprise network and thereby can waste bandwidth. In such instances, access nodes can discard received multicast data units not addressed to a client associated with that access node.

In other instances, a multicast tunnel can be defined for each native multicast group. In such instances, only the access network nodes in an mVLAN that are connected to a client device that subscribes to the native multicast group will receive a multicast data unit. Such instances, however, will involve establishing and maintaining a large number of multicast tunnels over the same physical links in the enterprise network. Additionally, the bandwidth of the enterprise can also be burdened with the large amount of signaling that can be required to maintain the large amount of multicast tunnels. Thus, a decision can be made regarding the number of native multicast groups to associate with a single multicast tunnel.

In yet other instances, a multicast tunnel can be defined for each native multicast group for a set of native multicast groups, and a separate (single) multicast tunnel can be defined for the remaining native multicast groups in an enterprise network. Such instances involve a combination of the two instances (or extreme cases) described above and can form an intermediate scenario regarding the trade-off between network and access node efficiency and the resources required to maintain large numbers of multicast tunnels and their associated signaling overhead.

In the network 300 described in FIG. 3, a multicast data unit associated with a native multicast group can be received from the network 301 at a core network node 321 and/or 322. The core network nodes 321 and/or 322 can include a listener table or an mVLAN identifier table and can analyze the header of the multicast data unit and identify the mVLANs that are associated with the destination devices addressed in the multicast data unit header (i.e., identify the mVLANs that are actively listening to the native multicast group). The multicast data unit can then be sent (based on a multicast forwarding information base (MFIB) to one or more virtual routers (VRFs) in the core network node 321 and/or 322 and associated with the mVLANs listening to the native multicast group.

Each virtual router within the core network node 321 and/or 322 can include, for example, an L2 multicast tunnel database or lookup table (e.g., multicast forwarding database (MFDB)) that can identify the multicast tunnels associated with the mVLANs. Based on the identification of the appropriate multicast tunnels, the core network node 321 and/or 322 can either identify existing multicast tunnels to send the multicast data units to the destination mVLANs or identify the need to define new multicast tunnels. In some embodiments, the virtual router can identify and/or select the relevant multicast tunnels based on an L2 lookup on an L2 multicast destination address within the multicast data unit (e.g., within an MFDB).

Each multicast tunnel can be associated with a multicast tunnel module (not shown) within the core network node 321 and/or 322. The multicast tunnel module can encapsulate the multicast data units with an L3 multicast header, and forward the multicast data unit from the core network node 321 and/or 322 via a tunnel. In some embodiments, the multicast data unit can be forwarded via a tunnel based on an MFIB associated with the tunnel.

Hence, in the network 300, a given core network node 321 and/or 322 can forward a multicast data unit to one or multiple multicast tunnels depending on the number of native multicast groups associated with each multicast tunnel. Note that, in some embodiments, a native multicast group can be mapped to a specific multicast tunnel even if multiple native multicast groups are mapped to that multicast tunnel. The decision regarding the number of native multicast groups to associate with each multicast tunnel can depend on the enterprise policy regarding the trade-off between network and access node efficiency and the resources required to maintain large numbers of multicast tunnels and their associated signaling overhead.

Figures 4, 5:
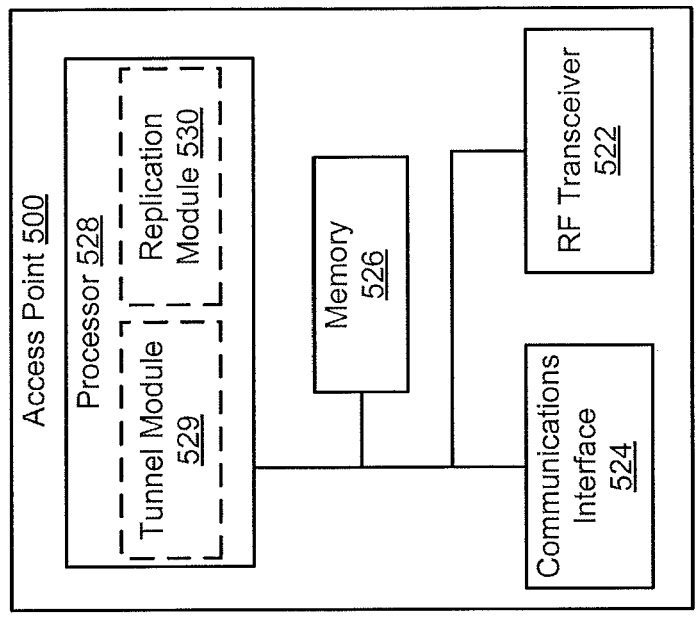
FIG. 4 is a schematic illustration of a multicast VLAN identifier table implemented in (or accessible to) a core network node, according to an embodiment.
FIG. 5 is a system block diagram of an access point, according to an embodiment.

FIG. 4 is a schematic illustration of a multicast VLAN identifier table 400 implemented in (or accessible to) a core network node, according to an embodiment. The multicast VLAN identifier table 400 can be similar to or can be a part of the multicast VLAN module 712 in FIG. 7 discussed below and can be a database or a lookup table located in the memory of the core network node. The core network node within which the multicast VLAN identifier table 400 is implemented can be similar to the core network node 130 in FIG. 1 and core network nodes 321 and 322 in FIG. 3. The multicast VLAN identifier table 400 has two columns, shown as multicast VLAN 420 and member VLANs 440 respectively. Each entry (i.e., row) of the multicast VLAN identifier table 400 defines an identifier associated with a multicast VLAN (mVLAN) controlled (or managed) by the core network node and the VLAN identifiers associated with each member VLAN within an individual mVLAN.

Specifically, the first column, multicast VLAN 420, contains mVLAN identifiers (e.g., identifier 1, 2), each of which uniquely identifies an mVLAN controlled or managed by the core network node (or host core device). An mVLAN identifier can be, for example, a number, a text string, a symbol, a binary data or data in any other suitable format that can be used to uniquely identify an mVLAN. The second column, VLAN members 440, includes an identifier associated with each member VLAN within an individual mVLAN. Similar to the case of the mVLANs, a VLAN member identifier can be, for example, a number, a text string, a symbol, a binary data or data in any other suitable format that can be used to uniquely identify the different VLANs located within an individual mVLAN. In the example shown in FIG. 4, two VLANs namely, VLAN_C and VLAN_D, are associated with mVLAN 1, and two VLANs namely, VLAN_E and VLAN_F, are associated with mVLAN 2.

In some embodiments, the multicast VLAN identifier table can include a third column (not shown in FIG. 4) that can include entries denoting whether the core network node associated with managing an mVLAN is designated and functions as a master device or the back-up device for the a specific mVLAN. In yet other embodiments, the multicast VLAN identifier table can also include a third or fourth column (not shown in FIG. 4) that can include entries containing the media access control (MAC) addresses of each intermediary network nodes included in each multicast tunnel that operatively couples the core network node to the appropriate access network nodes in each VLAN included in the mVLAN. Note that the outer MAC header of a multicast data unit associated with an mVLAN will include a multicast MAC address rather than a unicast MAC address of the intermediate nodes. If the multicast data unit is being sent via a multicast tunnel, then the outer IP header will also include a multicast Destination IP address.

As mentioned above, the different core network nodes can be dynamically designated as the master device to manage an mVLAN and can also be dynamically de-designated from managing an mVLAN. Hence, the entries in the multicast VLAN identifier table 400 can be dynamically updated to reflect the current status of the core network node in managing the different mVLANs in the network. In some embodiments, the multicast VLAN identifier table 400 can be maintained and updated by, for example, a control module (e.g., the control module 724 in FIG. 7) of the core network node. For example, when the core network node temporarily fails and is de-designated from the role of the master device for an mVLAN such as, for example, mVLAN 1 in FIG. 4, the control module can be configured to change the status in the first entry of third column the multicast VLAN identifier table (not shown in FIG. 4 and corresponding to the relationship of the core network node to the mVLAN) from, for example, master to back-up. In another example, when the core network node is designated as the master device (e.g., from the back-up device) for the mVLAN identified by the mVLAN identifier 1, the control module can be configured to change the status in the first entry of the third column of the multicast VLAN identifier table (not shown in FIG. 4 and corresponding to the relationship of the core network node to the mVLAN) from back-up to master. Additionally, in some instances, when the core network node is not designated to function as a master device or back-up device for one or more mVLANs in the network, the control module can, for example, change the corresponding status indicator(s) in the multicast VLAN identifier table to, for example, "Not Available—N/A."

FIG. 5 is a system block diagram of an access point 500, according to an embodiment. Similar to access point 351 in the converged network 300 shown in FIG. 3, access point 500 can be any device that connects one or more wireless client devices to a network (e.g., via an access network node) using for example, Wi-Fi, Bluetooth or other wireless communication standards. For example, access point 500 can be a wireless access point (WAP). As shown in FIG. 5, access point 500 includes a radio frequency (RF) transceiver 522, a communications interface 524, a memory 526, and a processor 528 that contains a tunnel module 529 and a replication module 530. Each component of access point 500 is operatively coupled to the other components of the access point 500.

The memory 526 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 526 can store instructions to cause the processor 528 to execute modules, processes and/or functions associated with the access point 500.

Furthermore, the operations of the RF transceiver 522 (e.g., transmit/receive data units), the communications interface 524 (e.g., transmit/receive data units), tunnel module 529 (e.g., encapsulate/decapsulate unicast and multicast data units), as well as manipulations on memory 526, can be controlled by the processor 528. The processor 528 can be, for example, a general purpose processor, a Field Programmable Gate Array (FPGA), an Application Specific Integrated Circuit (ASIC), a Digital Signal Processor (DSP), and/or the like.

The processor 528 can run and/or execute application processes and/or other modules, processes and/or functions associated with the access point 500. The processor 528 includes a tunnel module 529 that can execute application processes and/or other modules, processes and/or functions associated with establishing and maintaining a unicast tunnel or multicast tunnel (e.g., Generic Routing Encapsulation (GRE) or Control and Provisioning of Wireless Access Points (CAPWAP) tunnels, etc.) as described in greater detail herein. For example, the tunnel module 529 can encapsulate and decapsulate incoming and/or outgoing data units, respectively, passing through the tunnel.

Access point 500 can communicate with a wireless client device (e.g., a Wi-Fi enabled laptop, a mobile phone) using any suitable wireless communication standard such as, for example, Wi-Fi, Bluetooth, and/or the like. Specifically, access point 500 can be configured to receive data units and/or send data units through the RF transceiver 522, when communicating with a wireless client device. Furthermore, in some embodiments, a first access point of a network can use a first wireless communication standard to wirelessly communicate with a first wireless client device operatively coupled to the first access point (e.g., via a first port); the first access point can also use a second wireless communication standard to wirelessly communicate with a second wireless client device operatively coupled to the first access point (e.g., via a second port). For example, as shown in FIGS. 3 and 5, access point 351 can send data units through its RF transceiver 522 to a wireless client device 361 (e.g., a Wi-Fi enabled laptop) based on the Wi-Fi standard; access point 351 can also send data units from its RF transceiver 522 to another wireless client device 362 (e.g., a Bluetooth-enabled mobile phone) based on the Bluetooth standard.

In some instances, access point 500 can be operatively coupled to an access network node by implementing a wired connection between communications interface 524 of the access point 500 and the communications interface of the access network node. The wired connection can be, for example, twisted-pair electrical signaling via electrical cables, fiber-optic signaling via fiber-optic cables, and/or the like. As such, access point 500 can be configured to receive data units and/or send data units through communications interface 524 that is connected with the communications interface of an access network node, when access point 500 is communicating with the access network node. In other instances, a first access point of a network can implement a wired connection (e.g., twisted-pair electrical signaling) with a first access network node operatively coupled to the first access point; and a second access point of the network can implement a different wired connection (e.g., fiber-optic signaling) with a second access network node operatively coupled to the second access point.

In some instances, when the network node (e.g., a core network node) at the end of the tunnel and the intervening wired network nodes (e.g., access network nodes, aggregation network nodes) are within a network (as described with respect to FIG. 3), tunnel module 529 can be configured to encapsulate a data unit with either a unicast tunnel header or a multicast tunnel header according to a tunneling protocol such as an MPLS, GRE or an Ethernet-over-layer-3 (CAPWAP) tunneling protocol. In such instances, access point 500 can send a data unit to the core network node via a unicast tunnel and/or receive a data unit from a core network node via a unicast tunnel or a multicast tunnel through intervening wired network nodes.

For example, in some instances, as described with respect to FIGS. 3 and 5, access point 500 can be configured to format a data unit (e.g., a data packet, a data frame, a data portion) (or a control unit) received from a wireless client device (such as the wireless client device 361 or 362) operatively coupled to access point 500, and send the data unit (or control unit) to another network node such as a core network node via a tunnel (e.g., Generic Routing Encapsulation (GRE) or Control and Provisioning of Wireless Access Points (CAPWAP) tunnels, etc.). Access point 500 can also decapsulate a data unit received via a tunnel from another network node such as a core network node (321 or 322 in FIG. 3), before forwarding the decapsulated data unit to a wireless client device operatively coupled to access point 500.

Specifically, upon receiving a data unit from a wireless client device operatively coupled to access point 500, the tunnel module 529 can encapsulate the data unit (e.g., add a header portion, a footer portion, and/or modify any other identifiers included within the data unit) according to a specific tunneling protocol. The encapsulated data unit can then be sent through communications interface 524 to an access network node connected to access point 500, from where the encapsulated data unit is forwarded along the unicast tunnel to a network node at the end of the tunnel. On the other hand, upon receiving a data unit from an access network node (that is sent through a tunnel from a network node) connected to access point 500, tunnel module 529 can decapsulate the data unit (e.g., remove a header portion, a footer portion, and/or modify any other identifiers included within the data unit) according to a specific tunneling protocol. The decapsulated data unit is then sent by RF transceiver 522 to a wireless client device operatively coupled to access point 500.

The replication module 530 can be a hardware module and/or software module (stored in memory 526 and executed in processor 528) that can store data related to reading the information contained within the headers of multicast data packets that arrive at the access point 500. The replication module 530 can replicate a first instance (or copy) of a multicast data unit from, for example, the access network node, to create or define a second instance (and/or a third or fourth instance of the data unit, etc.). The second and/or third and/or fourth instance of the data unit can be sent from the replication module 530 via the RF transceiver 522 to one or multiple wireless client devices operably coupled to the access point 500.

In some instances, for example, the MAC addresses of wireless client devices can be stored in the replication module 530, such that a wireless client device can be identified by access point 500 upon being operatively coupled to access point 500. In such instances, storing the MAC addresses of the wireless client devices can allow access point 500 to successfully replicate instances of multicast data units received from the access network node and send the newly-replicated instances (or copies) of multicast data units to one or multiple wireless client devices. In another example, information associated with VLAN identifiers, mVLAN identifiers, multicast tunnel identifiers and unicast tunnel identifiers can also be stored in the replication module 530. This can allow the access point 500 to quickly identify a unicast tunnel associated with, for example, a core network node that can be used to forward upstream data units.

Figure 6:
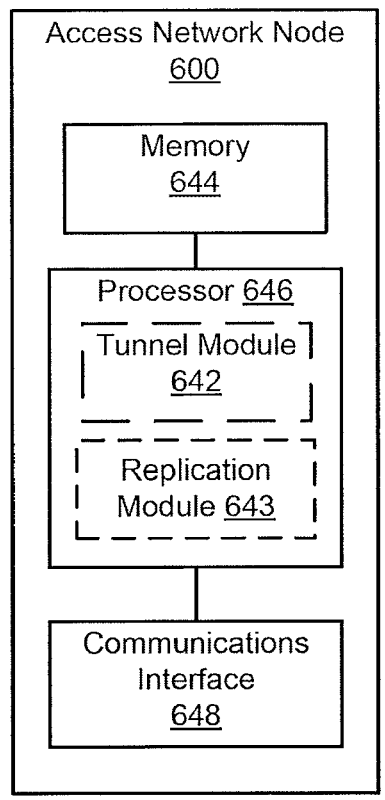
FIG. 6 is a system block diagram of an access network node, according to an embodiment.

FIG. 6 is a system block diagram of an access network node 600, according to an embodiment. Similar to access network node 341-344 in the converged network 300 shown in FIG. 3, access network node 600 can be any device that connects one or more wired client devices to a network. The access network node 600 can be, for example, a hub, an Ethernet switch, etc. More specifically, access network node 600 is configured to ensure data units are transmitted between one or more aggregation network nodes, wired client devices, and/or access points that are operatively coupled to access network node 600. As shown in FIG. 6, access network node 600 includes a communications interface 648, a memory 644, and a processor 646 that includes a tunnel module 642 and a replication module 643. Each component of the access network node 600 is operatively coupled to the other components of access network node 600.

The memory 644 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 644 can store instructions to cause the processor 646 to execute modules, processes and/or functions associated with the access network node 600.

The operations of communications interface 648 (e.g., transmit/receive data units), tunnel module 642 (e.g., encapsulate/decapsulate data units), as well as the manipulations on the memory 644 (e.g., update a policy table), are controlled by the processor 646. Similar to the case of the access point 500 (FIG. 5), the processor 646 of the access network node 600 can be, for example, a general purpose processor, a Field Programmable Gate Array (FPGA), an Application Specific Integrated Circuit (ASIC), a Digital Signal Processor (DSP), and/or the like. The processor 646 is operatively coupled with the memory 644 and can be configured to run and/or execute processes, and/or other modules, and/or functions associated with the access network node 600. The processor 646 includes a replication module 643 and a tunnel module 642 that can execute application processes and/or other modules, processes and/or functions associated establishing and maintaining a unicast tunnel and/or a multicast tunnel (e.g., Generic Routing Encapsulation (GRE) or Control and Provisioning of Wireless Access Points (CAPWAP) tunnels, etc.) as described in greater detail herein.

The communications interface 648 of access network node 600 can include, for example, at least two ports (not shown in FIG. 5) that can be used to implement one or more wired connections between access network node 600 and one or more access points, wired client devices, and/or aggregation network nodes. The wired connection can be, for example, twisted-pair electrical signaling via electrical cables, fiber-optic signaling via fiber-optic cables, and/or the like. As such, access network node 600 can be configured to receive data and/or send data through one or more ports of the communications interface 648 that are connected to the communications interfaces of one or more access points, wired client devices, and/or aggregation network nodes. Furthermore, in some instances, access network node 600 can implement a wired connection with one of an access point, a wired client device, or an aggregation network node that is operatively coupled to access network node 600 through one port of the communications interface 648. The access network node 600 can also implement a different wired connection with another access point, wired client device, or aggregation network node that is operatively coupled to access network node 600 through another port of communications interface 648. For example, as shown in FIG. 3, access network node 341 can implement one wired connection such as twisted-pair electrical signaling to connect with access point 351, while implementing a different wired connection such as fiber-optic signaling to connect with client device 363.

Similar to the description of FIG. 3, access network node 600 can be one of the intervening wired network nodes between an access point and a core network node, through which a unicast tunnel and/or a multicast tunnel is established between the access point and the core network node. In such configurations, access network node 600 can be configured to forward a unicast tunneled data unit and/or a multicast tunneled data unit. For example, similar to access network node 341 shown in FIG. 3, access network node 600 can forward one or multiple unicast tunneled data unit(s) and/or multicast tunneled data unit(s) encapsulated according to, for example, an Ethernet-over-layer-3 tunneling protocol (CAPWAP protocol) that is received from an access point, to the core network node via a unicast or multicast Ethernet-over-layer-3 tunnel (CAPWAP Tunnel) or a GRE tunnel connecting access point and core network node.

Similar to the description of FIG. 3, access network node 600 can format a data unit received from a wired client device directly or operatively coupled to access network node 600, and send the data unit to another network node such as a core network node via a tunnel. Access network node 600 can also decapsulate a unicast data unit received via a unicast tunnel and/or a multicast data unit received from a multicast tunnel, before forwarding the decapsulated data unit to a wired client device and/or an access point directly or operatively coupled to access network node 600. The tunnel module 642 (shown in the processor 646) of the access network node 600 performs the unicast data unit encapsulation and decapsulation and/or the multicast data unit encapsulation and decapsulation. Specifically, upon receiving a data unit from a wired client device operatively coupled to access network node 600, the tunnel module 642 is configured to encapsulate the data unit (e.g., add a header portion, a footer portion, and/or modify any other identifiers included within the data unit) according to the protocol of the tunnel. The encapsulated data unit is then sent through a port of the communications interface 648 to an aggregation network node connected to access network node 600, from where the encapsulated data unit is forwarded along the tunnel to a core network node. On the other hand, upon receiving a multicast data unit from an aggregation network node connected to access network node 600 that is sent through a multicast tunnel (associated with a multicast VLAN—mVLAN) from a core network node, the tunnel module 642 can decapsulate the data unit (e.g., remove a header portion, a footer portion, and/or modify any other identifiers included within the data unit) according to the protocol of the tunnel. The decapsulated packet is then sent through a port of communications interface 648 to a wired client device.

In some instances, the access network node 600 can receive a request from a first client device to associate the first client device with a native multicast group via at least one of an Internet Group Management Protocol (IGMP) join request or a Multicast Listener Discovery (MLD) join request. In such instances, the access network node 600 can receive a request from a second client device to associate the second client device with a native multicast group via at least one of an Internet Group Management Protocol (IGMP) join request or a Multicast Listener Discovery (MLD) join request. The first and/or second client devices can be, for example, a wired client device. In such instances, the access network node 600 can send to a core network node a request to associate with a native multicast group a first client device that is associated with a first virtual local area network (VLAN). The access network node 600 can also send to a core network node, a request to associate with the native multicast group a second client device that is associated with a second VLAN.

In such instances, the access network node 600 can receive, at the replication module 643, from the core network node (via a multicast tunnel), a first instance of a data unit associated with the native multicast group and to be sent to a set of client devices associated with a multicast VLAN including the first VLAN and the second VLAN. The access network node can define, at the replication module 643, a second instance (or copy) of the data unit and a third instance (or copy) of the data unit based on the first instance of the data unit. The access network node 600 can send the second instance of the data unit to the first client device based on the first client device being associated with the multicast VLAN via the communications interface 648. The access network node 600 can also send the third instance of the data unit to the second client device based on the second client device being associated with the multicast VLAN via the communications interface 648.

The replication module 643 can be a hardware module or software module (stored in memory 644 and executed in processor 646) that can read the information contained within the headers of multicast data units that arrive at the access network node 600. The replication module 643 can replicate a first instance (or copy) of a multicast data unit received from, for example, the aggregation network node, to create a second instance (and/or a third or fourth instance) of the data unit. The second and/or third and/or fourth instance of the data unit can be sent from the replication module 643 via the communications interface 648 to one or multiple wired client devices and/or access points operably coupled to the access network node 600.

In some instances, for example, the MAC addresses of wired client devices and/or access points can be stored in the replication module 643, such that a wired client device and/or access point can be recognized by the access network node 600 upon being operatively coupled to access network node 600. In such instances, storing the MAC addresses of the wired client device and/or access point can allow the access network node 600 to successfully replicate instances of multicast data units received from the aggregation network node and send the newly replicated instances (or copies) of the data units to one or multiple wired client device and/or access point. In another example, information associated with VLAN identifiers, mVLAN identifiers, multicast tunnel identifiers and unicast tunnel identifiers can also be stored in the replication module 643. This can assist the access network node 600 to quickly identify a unicast tunnel and/or a multicast tunnel associated with, for example, a core network node that can be used to forward upstream data units.

FIG. 7 is a system block diagram of a core network node 700, according to an embodiment. Similar to the core device 321 and the core device 322 in the network 300 shown in FIG. 3, the core device 700 can be any switching and/or routing device positioned in the physical core, or backbone, of a network (e.g., a converged wired/wireless network), and is configured to operatively couple the remaining devices (e.g., aggregation nodes, access nodes) of the network to one or more external networks that provide access to data resources and/or information services. Particularly, the core device 700 is configured to, for example, be designated and function as a master device or a back-up device for a VLAN and/or a multicast VLAN (mVLAN).

The core network node 700 includes a communications interface 730; a memory 710 that includes a multicast VLAN identifier table 712; and a processor 720 that includes a tunnel module 722 and a control module 724. Operation(s) of the communications interface 730 (e.g., transmit/receive data units), the tunnel module 722 (e.g., encapsulate/decapsulate data units), and the control module 724 (e.g., advertise subnet routes for VLANs contained within an mVLAN, forward upstream and downstream traffic for an mVLAN), as well as manipulations on the multicast VLAN identifier table 712

(e.g., modify an entry) or other portions of the memory 710, can be controlled by the processor 720.

The communications interface 730 of the core network node 700 can include, for example, at least two ports (not shown in FIG. 7) that can be used to implement one or more wired connections between the core network node 700 and one or more aggregation network nodes, one or more access network nodes, other core network nodes, upstream routers, and/or devices of other (external) networks. The wired connections can be, for example, twisted-pair electrical signaling via electrical cables, fiber-optic signaling via fiber-optic cables, and/or the like. As such, the core network node 700 can be configured to receive (unicast and/or multicast) data units and/or send (unicast and/or multicast) data units through one or more ports of the communications interface 730 that are connected to the communications interfaces of one or more aggregation network nodes, one or more access network nodes, other core network nodes, upstream routers, and/or devices of other (external) networks. Furthermore, in some configurations, the core network node 700 can implement a wired connection with one of an aggregation network node, an access network node, another core network node, an upstream router, or a device of another (external) network through one port of the communications interface 730, while implementing a different wired connection with another aggregation network node, access network node, core network node, upstream router, or device of another network through another port of the communications interface 730.

In some configurations, as described with respect to FIG. 3, the core network node 700 can format a unicast data unit and/or a multicast data unit (e.g., data packet, data cell, data frame) to be sent to one or multiple an access network nodes via one or multiple unicast tunnel(s) or multicast tunnel(s) (e.g., an Ethernet-over-layer-3 tunnel (e.g., Ethernet-in-GRE, CAPWAP, etc.), a MPLS tunnel). The core network node 700 can also receive and decapsulate an encapsulated data unit from an access node via a tunnel. Furthermore, the core network node 700 can also forward data units to and/or receive data units from other network nodes that are operatively coupled to the core network node 700, including other core network nodes, aggregation network nodes, upstream routers and/or devices in other (external) networks, without using any tunneling technology.

The processor 720 can be any suitable processor configured to run and/or execute the modules included in or accessed by the processor 720. Similar to the case of the access network node 600 (FIG. 6), the processor 720 of the core network node 700 can be, for example, a general purpose processor, a Field Programmable Gate Array (FPGA), an Application Specific Integrated Circuit (ASIC), a Digital Signal Processor (DSP), and/or the like. Each module in the processor 720 can be any combination of hardware-based module and/or software-based module (e.g., a module of computer code stored in memory 710 and/or executed at the processor 720) capable of performing one or more specific functions associated with that module.

The tunnel module 722 is configured to encapsulate unicast and/or multicast data units before sending the encapsulated unicast and/or multicast data units to an access network node via a unicast and/or multicast tunnel respectively. The tunnel module 722 can also decapsulate data units that are received from an access network node via a tunnel such that the decapsulated data units can be further forwarded to, for example, an upstream router. The control module 724 can manage the anchoring functionality of the core network node 700 with respect to one or more VLANs and/or mVLANs. Specifically, the control module 724 can maintain and update a multicast VLAN identifier table 712; advertise subnet routes of all the VLANs included within an mVLAN (for which the core network node 700 is designated as a master device) to upstream routers and/or devices; receive and forward upstream traffic and downstream traffic for mVLANs (where the core network node 700 is designated as a master device) based on information stored in the multicast VLAN identifier table 712, and/or the like.

The memory 710 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 710 can store instructions to cause the processor 720 to execute modules, processes and/or functions associated with the core network node 700. The control information associated with performing the anchoring functionality for mVLAN(s) can be stored in the memory 710. For example, information associated with multicast VLAN identifiers anchored by the core network node 700 and the member VLANs within each mVLAN can be stored in the multicast VLAN identifier table 400, as shown and described in detail with respect to FIG. 4. In another example, although not shown in FIG. 7, information associated with subnet routes of the different VLANs associated with an mVLAN, for which the core network node 700 is designated as the master device, can be stored in a database in the memory 710.

Although the multicast VLAN identifier table 712 is shown in FIG. 7 as being included in the memory 710 of the core device 700, in some embodiments, the multicast VLAN identifier table 712 can be located in a memory of a separate device (e.g., a storage device) that is operatively coupled to and accessible to the core network node 700. Additionally, in some embodiments, data separate from the control information associated with performing the anchoring functionality for mVLAN(s) can also be stored in the memory 710. For example, information associated with tunneling multicast data units to one or more access nodes can be stored in the memory 710, such that establishing one or multiple multicast tunnels (e.g., a MPLS tunnel, an Ethernet-over-layer-3 tunnel) with one or more of the access nodes can be quickly initialized by the core network node 700.

As described above, in some instances, the core network node 700 can associate with a native multicast group a first client device that is associated with a first VLAN and operatively coupled to the core network node 700 via a first access network node and an aggregation network node. The core network node 700 can also associate with the native multicast group a second client device that is associated with a second VLAN and operatively coupled to the core network node 700 via a second access network node and the aggregation network node. The core network node 700 can define a multicast VLAN including the first VLAN and the second VLAN based on the native multicast group. The core network node can also define a single instance of the multicast data unit for the multicast VLAN. The core network node 700 can receive a multicast data unit associated with the native multicast group.

In such instances, the core network node 700 can send the single instance of the multicast data unit to the aggregation network node via a multicast tunnel associated with the multicast VLAN. In such instances, the single instance of the multicast data unit is a first instance of the multicast data unit. The core network node 700 can send the first instance of the multicast data unit to the aggregation network node such that the aggregation network node defines, based on the first instance of the multicast data unit, a second instance of the multicast data unit and a third instance of the multicast data unit. The aggregation network node can send the second instance of the multicast data unit to the first access network node based on the first client device being associated with the multicast VLAN, and send the third instance of the multicast data unit to the second access network node based on the second client device being associated with the multicast VLAN.

Figure 8:
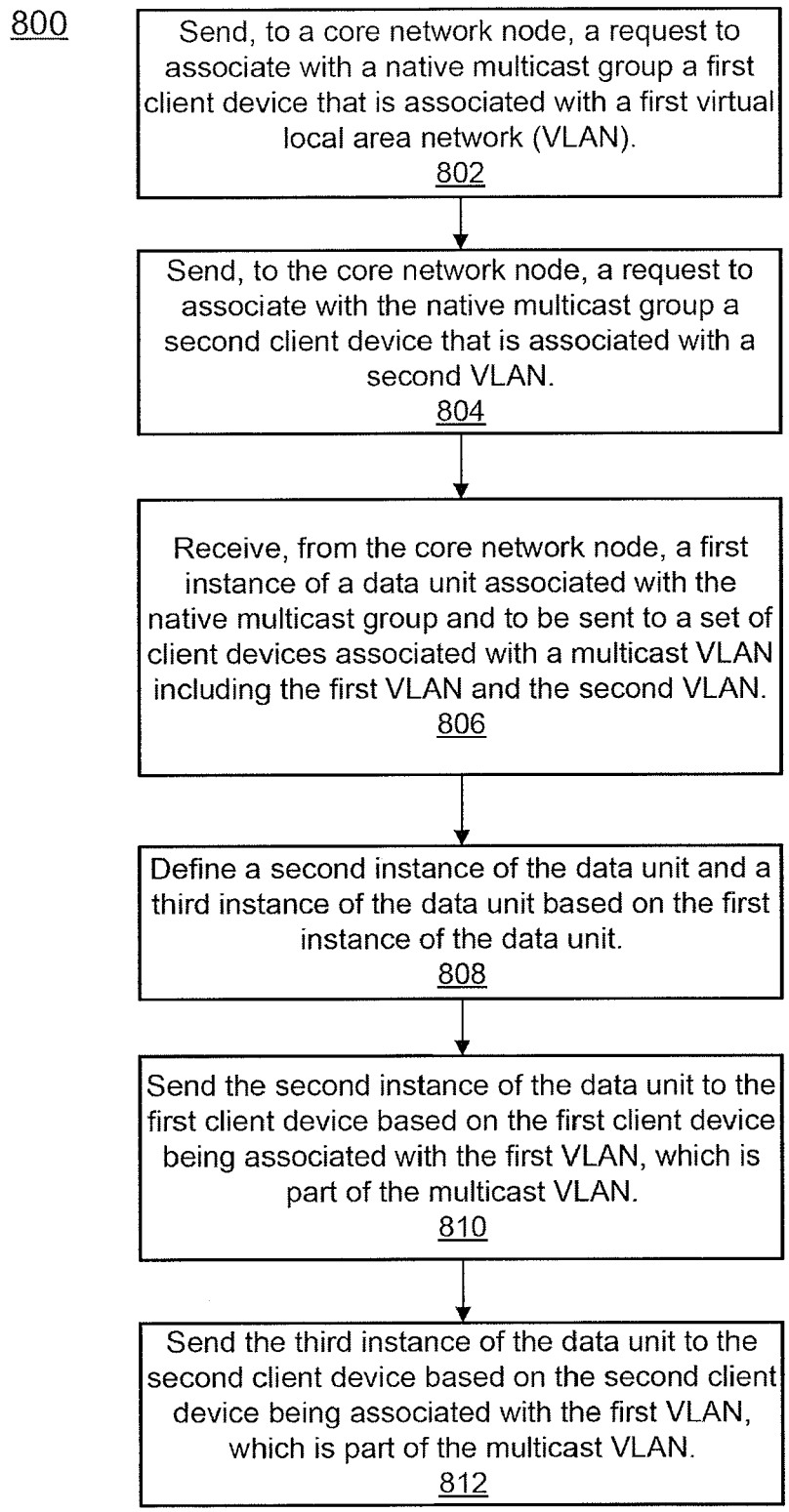
FIG. 8 is a flow chart illustrating a method for grouping client devices associated with separate VLANs into a multicast VLAN, according to an embodiment.

FIG. 8 is a flow chart illustrating a method 800 for grouping client devices associated with separate VLANs into a multicast VLAN, according to an embodiment. The method 800 includes sending from, for example, an access network node and/or an access point to, for example, a core network node, a signal requesting to associate with a native multicast group a first client device that is associated with a first virtual local area network (VLAN), at 802. The first client device can be a wired client device or a wireless client device. As described above, the request signal is sent from the access network node and/or the access point in response to the access network node and/or the access point receiving a signal from the first client device requesting to associate the first client device with the native multicast group via at least one of an Internet Group Management Protocol (IGMP) join request or a Multicast Listener Discovery (MLD) join request.

At 804, a second signal is sent from for example, the access network node and/or the access point to, for example, the core network node, requesting to associate with a native multicast group a second client device that is associated with a second virtual local area network (VLAN). As described above, the second request signal is sent from the access network node and/or the access point in response to the access network and/or the access point receiving a signal from the second client device requesting to associate the second client device with the native multicast group via at least one of an Internet Group Management Protocol (IGMP) join request or a Multicast Listener Discovery (MLD) join request.

At 806, a first instance of a data unit associated with the native multicast group is received by, for example, the access network node and/or the access point that is sent by, for example, the core network node. The data unit is to be sent to a set of client devices associated with a multicast VLAN (mVLAN) that includes the first VLAN and the second VLAN. As described above, the multicast VLAN that includes the first VLAN and the second VLAN is defined by the core network node. The core network code also defines a multicast tunnel associated with the native multicast group. The multicast tunnel is configured to allow the movement multicast data units from the core network node to the appropriate access network nodes in the mVLAN. Hence, the first instance of the data unit received from the core network node as discussed above can be through a multicast tunnel.

At 808, a second instance (or copy) of the data unit and a third instance (or copy) of the data unit is defined by, for example, the access network node and/or the access point based on the first instance of the data unit. As described above, the replication of the original (or first instance) of the data unit is performed at the replication module located in the processor of the access network node and/or at the replication module located in the processor of the access point. As described above, upon receiving a multicast data unit associated with the mVLAN from the core network node (via an aggregation network node) through a multicast tunnel, the tunnel module of the access network node and/or the tunnel module of the access point decapsulates the data unit (e.g., removes a header portion, a footer portion, and/or modify any other identifiers included within the data unit) according to the protocol of the tunnel. The decapsulated data unit is sent from the tunnel module to the replication module (of the access network node and/or the access point) through an internal bus to be replicated.

At 810, the second instance of the data unit is sent by, for example, the access network node and/or the access point to the first client device based on the first client device being associated with the first VLAN, which is part of the multicast VLAN. As described above, after defining (or generating) the second instance of the data unit, the replication module sends the second instance of the data unit to the first client device via the communications interface (in the case of the access network node) or the RF transceiver (in the case of the access point). As described above, the communications interface of the access network node can include, for example, at least two ports that can be used to implement one or more wired connections between access network node and one or more wired client devices, and/or aggregation network nodes. The wired connection can be, for example, twisted-pair electrical signaling via electrical cables, fiber-optic signaling via fiber-optic cables, and/or the like. The RF transceiver of the access point can also include, for example, at least two ports that can be used to implement one or more wireless connections between the access point and one or more wireless client devices. The wireless connection can be, for example, a Wi-Fi standard based connection, a Bluetooth standard based connection, a cellular connection such as 3G or 4G, and/or the like.

At 812, the third instance of the data unit is sent by, for example, the access network node and/or the access point to the second client device based on the second client device being associated with the first VLAN, which is part of the multicast VLAN. Details of the process of sending the third instance of the data unit to the second client device is similar to that of sending the second instance of the data unit to the first client device. In some instances, however, the wired connection between the communications interface of the access network node and first (wired) client device and the second (wired) client device can be of a different type as discussed above. Similarly, in other instances, the wireless connection between the RF transceiver of the access point and the first (wireless) client device and the second (wireless) client device can also be of a different type as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising: a core network node configured to associate with a native multicast group a first client device that is associated with a first virtual local area network (VLAN) and operatively coupled to the core network node via a first access network node and an aggregation network node, the core network node configured to associate with the native multicast group a second client device that is associated with a second VLAN and operatively coupled to the core network node via a second access network node and the aggregation network node, the core network node configured to define a multicast VLAN including the first VLAN and the second VLAN, the core network node configured to receive a multicast data unit associated with the native multicast group, the core network node configured to define a first instance of the multicast data unit for the multicast VLAN, the core network node configured to send the first instance of the multicast data unit to the aggregation network node via a multicast tunnel and such that the aggregation network node (1) defines, based on the first instance of the multicast data unit, a second instance of the multicast data unit and a third instance of the multicast data unit, (2) sends the second instance of the multicast data unit to the first access network node based on the first client device being associated with the first VLAN that is a member of the multicast VLAN, and (3) sends the third instance of the multicast data unit to the second access network node based on the second client device being associated with the second VLAN that is a member of the multicast VLAN.

2. The apparatus of claim 1, wherein the core network node is configured to receive the multicast data unit (1) from a third client device operatively coupled to the core network node via the first access network node and the aggregation network node and (2) via a tunnel defined between the first access network node and the core network node.

3. The apparatus of claim 1, wherein the native multicast group is a first native multicast group, the core network node is configured to define the multicast tunnel associated with the first native multicast group and a second native multicast group.

4. The apparatus of claim 1, wherein the core network node is configured to associate with the native multicast group a third client device that is associated with the second VLAN and operatively coupled to the core network node via the first access network node and the aggregation network node, the core network node configured to send the first instance of the multicast data unit to the aggregation network node such that (1) the first client device receives a fourth instance of the multicast data unit defined by the first access network node based on the second instance of the multicast data unit and (2) the third client device receives a fifth instance of the multicast data unit defined by the first access network node based on the second instance of the multicast data unit.

5. The apparatus of claim 1, wherein the core network node is configured to manage the native multicast group.

6. The apparatus of claim 1, wherein the core network node is configured to associate the first client device with the native multicast group based on at least one of an Internet Group Management Protocol (IGMP) join request or a Multicast Listener Discovery (MLD) join request.

7. The apparatus of claim 1, wherein the first access network node is a wired access network node and the second access network node is a wireless access point.

8. A non-transitory processor-readable medium storing code representing instructions to be executed by a processor, the code comprising code to cause the processor to: send, from an access network node and to a core network node via an aggregation network node, a request to associate with a native multicast group a first client device that is associated with a first virtual local area network (VLAN); send, from the access network node and to the core network node via the aggregation network node, a request to associate with the native multicast group a second client device that is associated with a second VLAN; receive, at the access network node and from the core network node, a first instance of a data unit associated with the native multicast group and to be sent to a set of client devices associated with a multicast VLAN including the first VLAN and the second VLAN; define, at the access network node, a second instance of the data unit and a third instance of the data unit based on the first instance of the data unit; send, from the access network node, the second instance of the data unit to the first client device based on the first client device being associated with the first VLAN that is a member of the multicast VLAN; and send, from the access network node, the third instance of the data unit to the second client device based on the second client device being associated with the second VLAN that is a member of the multicast VLAN.

9. The non-transitory processor-readable medium of claim 8, further comprising: receive, from the first client device, the request to associate the first client device with the native multicast group.

10. The non-transitory processor-readable medium of claim 8, wherein the code to cause the processor to receive includes code to cause the processor to receive the first instance of the data unit from the core network node via a multicast tunnel.

11. The non-transitory processor-readable medium of claim 8, wherein the code to cause the processor to receive includes code to cause the processor to receive the first instance of the data unit from the core network node via the aggregation network node.

12. The non-transitory processor-readable medium of claim 8, wherein the request to associate the first client device with the native multicast group is at least one of an Internet Group Management Protocol (IGMP) join request or a Multicast Listener Discovery (MLD) join request.

13. The non-transitory processor-readable medium of claim 8, wherein the core network node is configured to manage the native multicast group.

14. An apparatus, comprising: a core network node configured to associate with a first native multicast group a first client device that is associated with a first virtual local area network (VLAN) and operatively coupled to the core network node via a first access network node and an aggregation network node, the core network node configured to associate with a second native multicast group a second client device that is associated with the first VLAN and operatively coupled to the core network node via the first access network node and the aggregation network node, the core network node is configured to define a multicast VLAN including the first VLAN and a second VLAN, the core network node configured to define a multicast tunnel associated with the first native multicast group, the second native multicast group and the multicast VLAN, in response to associating the first client device with the first native multicast group and the second client device with the second native multicast group, the core network node configured to receive a first multicast data unit associated with the first native multicast group and a second multicast data unit associated with the second native multicast group, the core network node configured to send a first instance of the first multicast data unit to the aggregation network node via the multicast tunnel such that the aggregation network node (1) defines, based on the first instance of the first multicast data unit, a second instance of the first multicast data unit and a third instance of the multicast data unit, (2) sends the second instance of the first multicast data unit to the first access network node, and (3) sends the third instance of the first multicast data unit to a second access network node coupled to a third client device associated with the second VLAN and the first native multicast group, the core network node configured to send an instance of the second multicast data unit to the first access network node via the multicast tunnel such that the first access network node sends the instance of the second multicast data unit to the second client device based on the second client device being associated with the first VLAN and the second native multicast group.

15. The apparatus of claim 14, wherein the core network node is configured to receive the multicast data unit (1) from a fourth client device operatively coupled to the core network node via the first access network node and the aggregation network node and (2) via a tunnel defined between the first access network node and the core network node.

16. The apparatus of claim 14, wherein the core network node is configured to manage the first native multicast group.

17. The apparatus of claim 14, wherein the core network node is configured to associate the first client device with the first native multicast group based on at least one of an Internet Group Management Protocol (IGMP) join request or a Multicast Listener Discovery (MLD) join request.

* * * * *